(12) United States Patent
Nomura et al.

(10) Patent No.: US 11,618,321 B2
(45) Date of Patent: Apr. 4, 2023

(54) PANEL DEVICE

(71) Applicant: KABUSHIKI KAISHA TOKAI RIKA DENKI SEiSAKUSHO, Aichi (JP)

(72) Inventors: Yusuke Nomura, Aichi (JP); Akito Ishihara, Aichi (JP); Yuki Sakai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/388,952

(22) Filed: Jul. 29, 2021

(65) Prior Publication Data

US 2022/0032772 A1 Feb. 3, 2022

(30) Foreign Application Priority Data

Aug. 3, 2020 (JP) .............................. JP2020-131706

(51) Int. Cl.
  *B60K 35/00* (2006.01)
  *B60K 37/06* (2006.01)
  *B60K 37/04* (2006.01)
  *G09F 13/04* (2006.01)

(52) U.S. Cl.
  CPC .............. *B60K 35/00* (2013.01); *B60K 37/04* (2013.01); *B60K 37/06* (2013.01); *B60K 2370/139* (2019.05); *B60K 2370/16* (2019.05); *B60K 2370/332* (2019.05); *B60K 2370/34* (2019.05); *B60K 2370/345* (2019.05); *G09F 13/04* (2013.01)

(58) Field of Classification Search
  CPC ................ B60K 35/00; B60K 2370/16; B60K 2370/34; B60K 2370/139; B60K 2370/332; B60K 2370/345; B60K 37/04; B60K 37/06; G09F 13/04; G09F 13/10; G09F 9/30
  See application file for complete search history.

(56) References Cited

U.S. PATENT DOCUMENTS

| | | | |
|---|---|---|---|
| 2008/0211779 A1* | 9/2008 | Pryor | G06F 3/0488 345/173 |
| 2009/0273563 A1* | 11/2009 | Pryor | B60K 37/06 345/157 |
| 2018/0204493 A1 | 7/2018 | Sakamaki et al. | |

FOREIGN PATENT DOCUMENTS

| | | | | |
|---|---|---|---|---|
| JP | 6350489 32 | 7/2018 | | |
| WO | WO-2020018470 A1 * | 1/2020 | ............. | B60K 35/00 |
| WO | WO-2020218054 A1 * | 10/2020 | | |

* cited by examiner

*Primary Examiner* — Alan B Cariaso
(74) *Attorney, Agent, or Firm* — Tarolli, Sundheim, Covell & Tummino LLP

(57) ABSTRACT

A panel device includes a panel unit, a light-blocking layer, and an indicator light projector. The light-blocking layer is located between the panel unit and the indicator light projector, specifically, on a rear surface of the panel unit. The indicator light projector is located relatively close to the light-blocking layer. When indicators displayed on the panel unit are viewed from the outer side, representations provided by the indicator light projector are visually recognizable even when viewed from an angled position.

7 Claims, 5 Drawing Sheets

PANEL DEVICE

RELATED APPLICATIONS

The present invention is a Nonprovisional Application under 35 USC 111(a), claiming priority to Serial No. JP 2020-131706, filed on 3 Aug. 2020, the entirety of which is incorporated herein by reference.

BACKGROUND

Field

The present invention relates to a panel device that displays indicators.

Description of Related Art

Japanese Patent No. 6350489 discloses a conventional display device as an example of a panel device for a vehicle that is used for operating on-board devices of a vehicle. The display device includes, for example, an outer panel, a light emitting diode (LED), and a display formation plate. The display formation plate includes, for example, a light-projecting base material sheet, a light-blocking printed layer, and a tinted printed layer. The light-blocking printed layer includes an opening shaped in correspondence with a symbol icon. The display device diffuses the light of the LED with a symbol prism and allows the light to pass through the opening in the light-blocking printed layer to the outer panel so that various symbol icons are shown on the outer panel.

SUMMARY

In this type of panel device, the outer panel includes an indicator (pilot lamps) to indicate when a device is activated. It is desirable that such an indicator be highly recognizable on the outer panel.

One objective of the present disclosure is to provide a panel device ensuring that an indicator is visually recognizable.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a panel device includes a panel unit, a light-blocking layer, and an indicator light projector. The panel unit that is light-transmissive and one of colored or colorless. The light-blocking layer includes an indicator opening that is shaped in correspondence with an indicator to indicate when a device is activated. The indicator light projector emits light from a rear side of the panel unit and displays the indicator on the panel unit with the light passing through the indicator opening. The light-blocking layer is located between the panel unit and the indicator light projector.

The present disclosure ensures that the indicator is highly visually recognizable in the panel device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
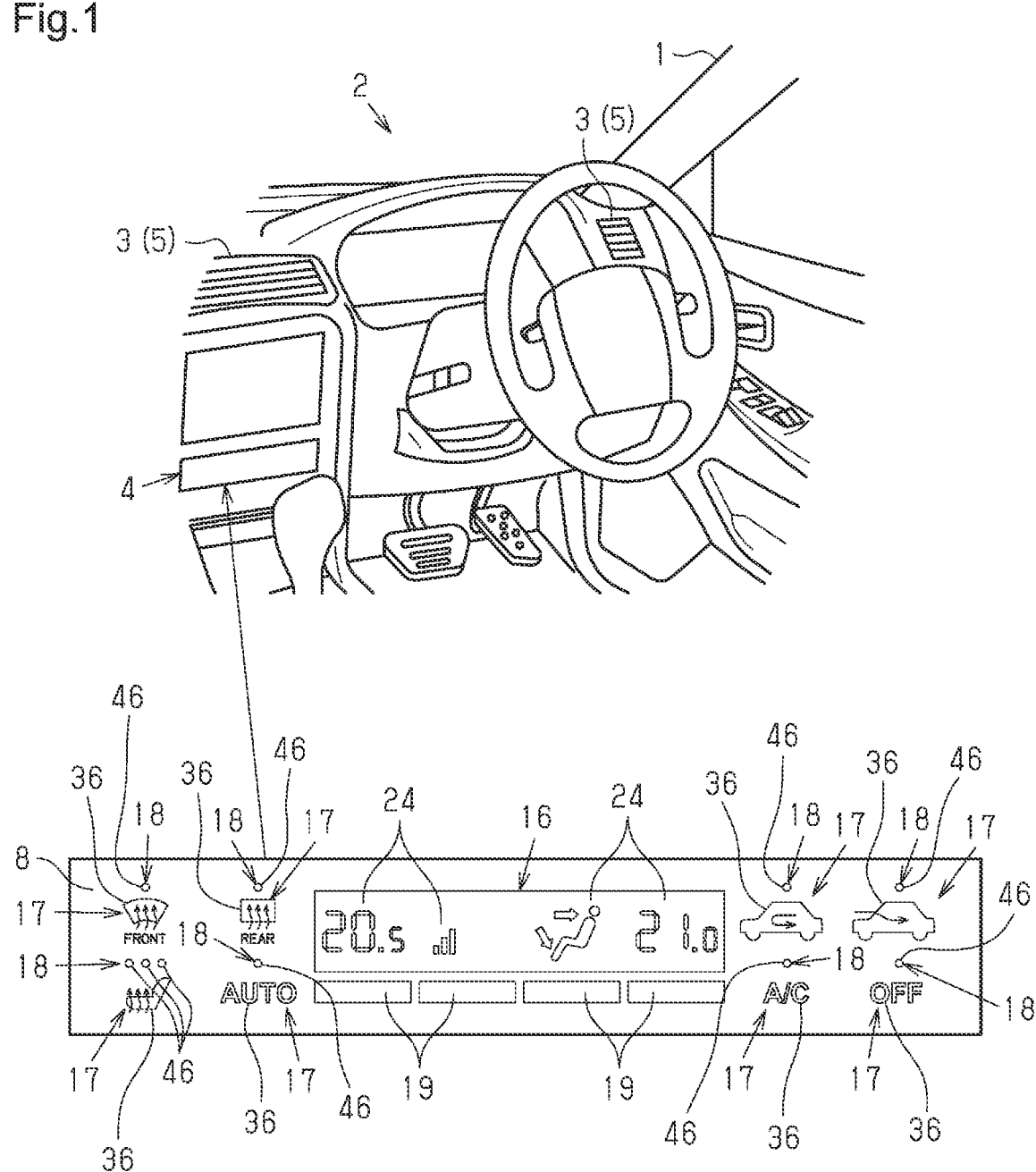
FIG. 1 is a front view of a panel device in accordance with an embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a panel device will now be described. In the description hereafter, to facilitate understanding, configurations may be partially exaggerated or simplified in the drawings. Further, elements in the drawings may not be to scale.

As shown in FIG. 1, a panel device 4 is arranged near a driver seat 2 of a vehicle 1 and operated to switch operation state of an on-board device 3. The panel device 4 is of a type that includes a panel display function, a touch-operation function, an indicator function, and the like. The panel display function displays, for example, the present operation state of the device 3 and shows symbols related to the device 3. The touch-operation function switches, for example, the operation state of the device 3 when the panel device 4 is touched. The indicator function indicates, for example, the operation state of the device 3 by switching a light on and off. The device 3 includes, for example, an air conditioner 5 that air-conditions the passenger compartment.

Figure 2:
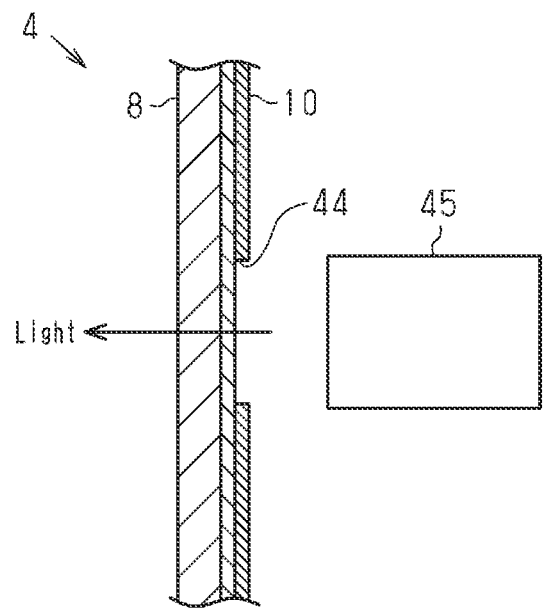
FIG. 2 is a cross-sectional view of the panel device.

As shown in FIG. 2, the panel device 4 includes a panel unit 8, a light-blocking layer 10, and an indicator light projector 45. In the description hereafter, a rear side refers to the side of the panel unit 8 opposite to the outer side that is visible to the user. The rear side of the panel unit 8 is where the indicator light projector 45 is located. Further, a rear surface refers to a surface directed toward the side opposite to the visible side. The panel unit 8, which is light-transmissive, is colored or colorless. The panel unit 8, which is light-transmissive, is colored or colorless. In the present example, the panel unit 8 is colored and light-transmissive. The panel unit 8 has, for example, a black background corresponding to the color of the light-blocking layer 10, which is printed in black (black printed). The light-blocking layer 10 includes an indicator opening 44 shaped in correspondence with an indicator 46. The indicator 46 indicates when the device 3 is activated. The light-blocking layer 10 is located between the panel unit 8 and the indicator light projector 45. The indicator light projector 45 emits light from the rear side of the panel unit 8 and displays the indicator 46 on the panel unit 8 with the light passing through the indicator opening 44.

As shown in FIG. 1, the panel device 4 includes a display 16, symbol portions 17, and indicator portions 18. The display 16 shows the present operation state of the device 3 on the panel device 4. The symbol portions 17 implement the touch-operation function of the panel device 4. The indicator portions 18 implement the indicator function of the panel device 4. The panel device 4 may only include the indicator portion 18 out of the display 16, the symbol portions 17, and the indicator portions 18. In the present example, the panel device 4 includes all three.

The symbol portions 17 are paired with the corresponding indicator portions 18. A single symbol portion 17 may be combined with a single indicator portion 18 to form a single set. Alternatively, a single symbol portion 17 may be combined with multiple indicator portions 18 to form a set. In the present example, the symbol portion 17 for a seat heater is provided with multiple (three in present example) indicator portions 18.

The panel device 4 includes multiple switches 19 operated to switch states of various functions shown on the display 16. Each switch 19 is, for example, a toggle switch. The switches 19 are arranged in correspondence with images 24 shown on the display 16. In the present example, the switches 19 include a driver seat temperature adjustment switch 19, a fan mode switch 19, an airflow adjustment switch 19, and a passenger seat temperature adjustment switch 19.

Figure 3:
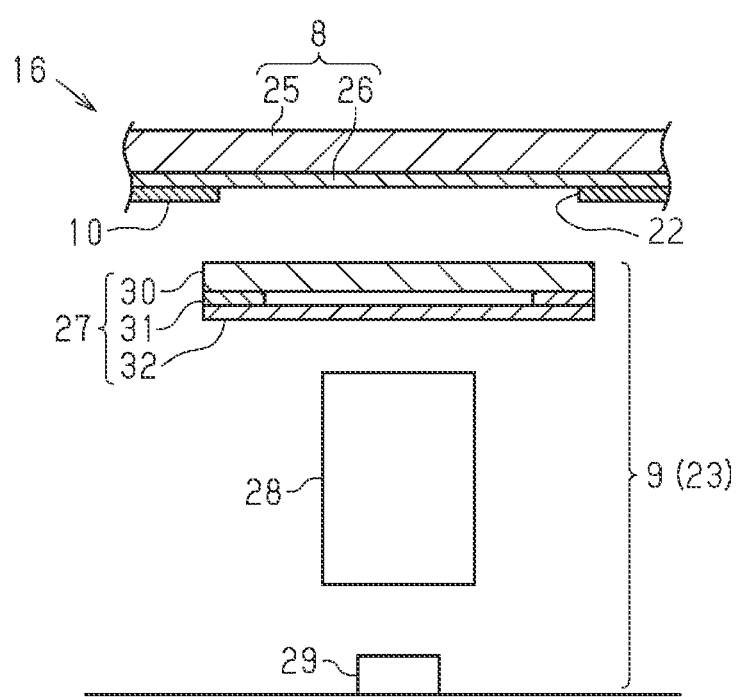
FIG. 3 is a cross-sectional view showing the structure of a display.

As shown in FIG. 3, the display 16 includes a window frame 22 that is arranged in the light-blocking layer 10 and an image displaying unit 23 that serves as a light source 9. The light-blocking layer 10 includes an inner edge that defines the window frame 22. The window frame 22 is arranged opposing the light source 9. The image displaying unit 23 projects the images 24 from the rear side of the panel unit 8 through the window frame 22 onto the panel unit 8. This displays the images 24 on the panel unit 8.

The specific structure of the display 16 will now be described. The panel unit 8 includes, for example, a resin panel 25 and a rear film 26. The resin panel 25 is, for example, a tinted panel (light attenuation member). The rear film 26 is adhered to the rear surface of the resin panel 25. For example, the rear film 26 includes a transparent film. The panel unit 8 may be, for example, flat or curved.

The light-blocking layer 10 is arranged on, for example, the rear surface of the rear film 26. In an example, the light-blocking layer 10 is printed in black. The light-blocking layer 10 is printed on, for example, the rear surface of the rear film 26. The light-blocking layer 10 is formed from a material that does not transmit light from the image displaying unit 23 to the panel unit 8. The light-blocking layer 10 is formed by performing, for example, laser printing, screen printing, ink-jet printing, pad printing, or the like.

The image displaying unit 23 includes, for example, a displaying unit 27, a lens 28, and a light emitting element 29. The displaying unit 27 includes an image display module 30 configured to display various images. The image display module 30 may be, for example, a liquid crystal display (LCD) or an organic light emitting diode (OLED) display. A diffusion sheet 32 is attached to the rear surface of the image display module 30 by a locally arranged tape member 31. The tape member 31 is, for example, double-sided tape. The light emitting element 29 is, for example, a light emitting diode (LED). The lens 28 increases the brightness of the light emitting element 29.

Figure 4:
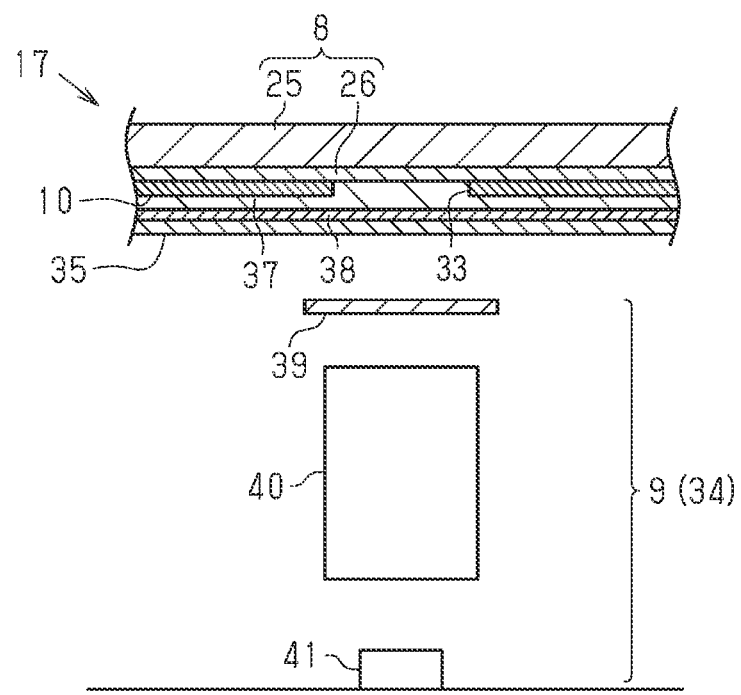
FIG. 4 is a cross-sectional view showing the structure of a symbol portion.

As shown in FIG. 4, each symbol portion 17 includes a mark opening 33 formed in the light-blocking layer 10, a mark light projector 34 that serves as the light source 9, and a detector 35. The mark opening 33 is shaped in correspondence with a mark 36. The mark light projector 34 emits light from the rear side of the panel unit 8 through the mark opening 33 to display the mark 36, which is shaped in correspondence with the mark opening 33, on the panel unit 8. The detector 35 is located inward from the mark opening 33 to detect when the panel unit 8 is touched at the mark opening 33.

The specific structure of the symbol portion 17 will now be described. Each mark opening 33 is formed in the light-blocking layer 10 and shaped in correspondence with the mark 36. For example, when the device 3 is the air conditioner 5, the mark 36 includes at least one of a front window defroster mark, a rear window defroster mark, a seat heater mark, an automatic operation mark, an air recirculation mark, an outside air mark, an air conditioner mark, and an OFF mark. A light attenuation layer 37, or a tinted layer, is formed on the rear surface of the light-blocking layer 10 to obtain the black appearance of the panel unit 8. The light attenuation layer 37 is formed on the entire rear surface of the light-blocking layer 10 and fills each mark opening 33.

The detector 35 is attached to the rear surface of the light attenuation layer 37 by a tape member 38. The detector 35 is, for example, a capacitance sensor. Alternatively, the detector 35 may use, for example, a resistive film, surface capacitance, projected capacitance, an ultrasonic surface acoustic wave, an optic sensor, or electromagnetic induction. The detector 35 detects when the panel unit 8 is touched at the mark 36. For example, the detector 35 has the shape of a sheet. The detector 35 is transparent (transparent electrode) so that the light from the light source 9 reaches the panel unit 8.

The mark light projector 34 includes, for example, a diffusion sheet 39, a lens 40, and a light emitting element 41. The diffusion sheet 39 is located between the detector 35 and the lens 40. The diffusion sheet 39 is, for example, a white sheet that transmits light. The light emitting element 41 is, for example, a light emitting diode (LED). The lens 40 increases the brightness of the light emitting element 41.

Figure 5:
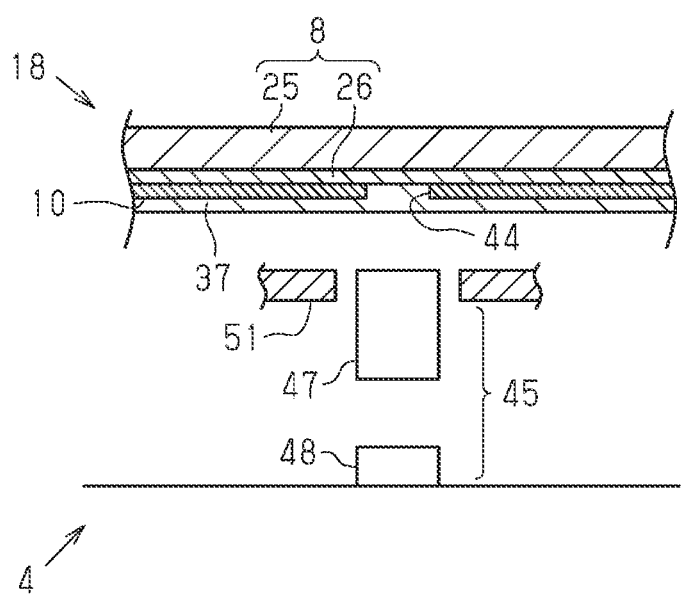
FIG. 5 is a cross-sectional view showing the structure of an indicator portion.

As shown in FIG. 5, each indicator portion 18 includes the indicator opening 44 and the indicator light projector 45. The indicator opening 44 is shaped in correspondence with the indicator 46. The indicator light projector 45 emits light from the rear side of the panel unit 8 through the indicator opening 44 to display the indicator 46, which is shaped in correspondence with the indicator opening 44, on the panel unit 8.

The specific structure of the indicator portion 18 will now be described. The indicator opening 44 is formed in the light-blocking layer 10 and shaped in correspondence with the indicator 46. The indicator opening 44 is, for example, circular. A single indicator portion 18 or multiple (three in present example) indicator portions 18 are provided for a single symbol portion 17. When multiple indicator portions 18 are provided for a single symbol portion 17, the indicator portions 18 are, for example, located adjacent to one another. The light attenuation layer 37 is arranged on the rear surface of the light-blocking layer 10 and fills each indicator opening 44. The symbol portion 17 and the indicator portion 18 do not have to share the same light attenuation layer 37 and may use separate light attenuation layers 37.

The indicator light projector 45 includes, for example, a lens 47 and a light emitting element 48. The light emitting element 48 is, for example, a light emitting diode (LED). The lens 47 increases the brightness of the light emitting element 48.

The lens 47 is fixed to a housing (not shown) of the panel device 4 by a bezel 51 that is provided around the lens 47. The front surface edge of the lens 47 is arranged in correspondence with the indicator opening 44. The front surface of the lens 47 is slightly larger than the indicator opening 44. The indicator 46 displayed by the indicator portion 18 on the panel unit 8 is smaller than the mark 36 displayed by the symbol portion 17 on the panel unit 8.

Figure 6:
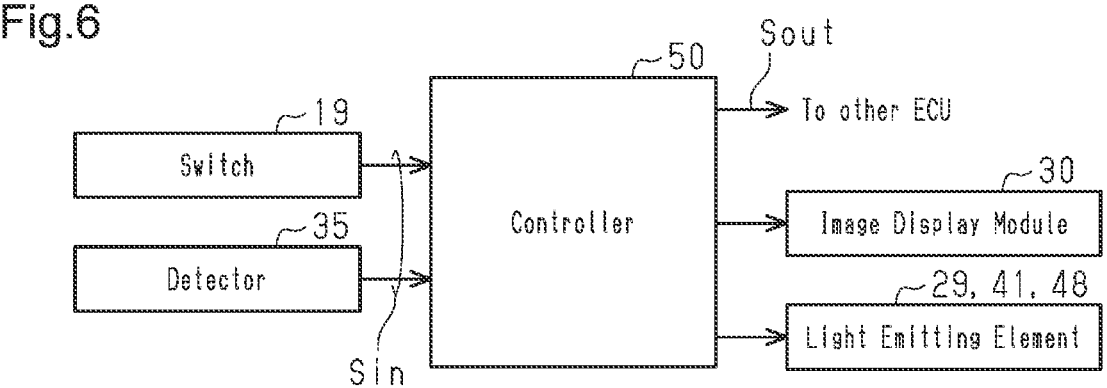
FIG. 6 is a diagram showing the electric configuration of the panel device.

As shown in FIG. 6, the panel device 4 includes a controller 50 that controls the panel device 4. The controller 50 receives inputs from the switches 19 and the detector 35. The controller 50 sends an output to another ECU, the image display module 30, and the light emitting elements 29, 41, and 48. The controller 50 detects a user operation performed in the panel unit 8 based on input signals Sin from the switches 19 and the detector 35. Then, the controller 50 outputs an operation signal Sout corresponding to the detection result to the other ECU. The other ECU is, for example, the ECU of the device 3. The controller 50 controls the image display module 30 and the light emitting elements 29, 41, and 48 based on the input signals Sin to switch the contents displayed on the panel unit 8.

The operation of the panel device 4 in the present embodiment will now be described.

Figure 7:
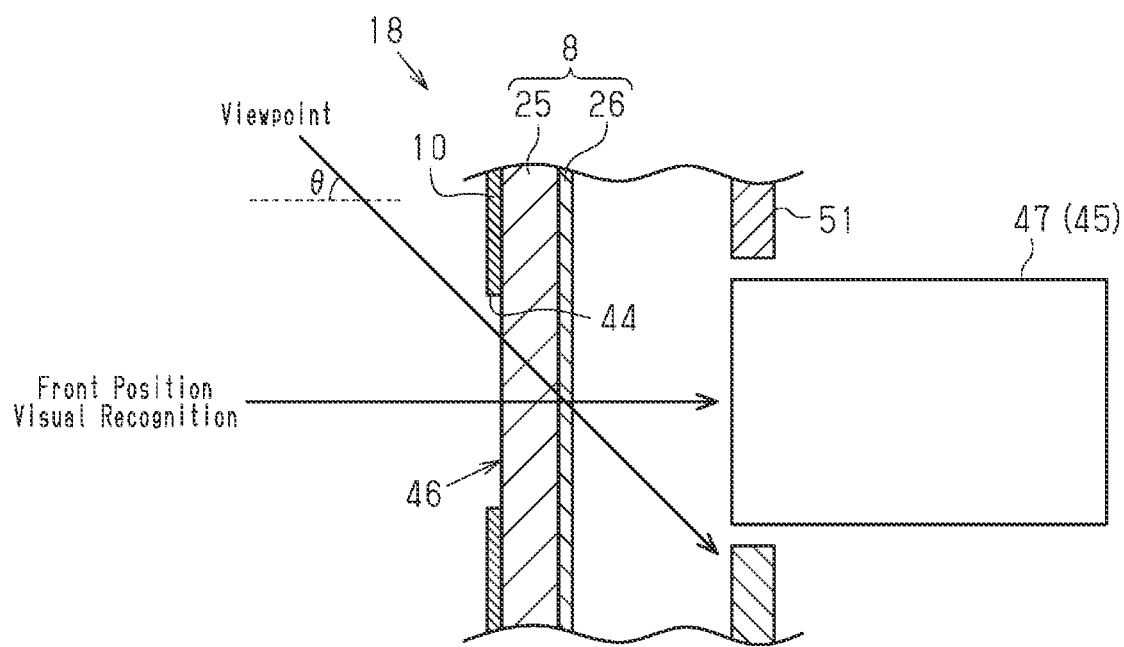
FIG. 7 is a diagram illustrating a conventional indicator portion.

FIG. 7 shows an example of the indicator portion 18 in the prior art in which the light-blocking layer 10 is arranged on the outer surface of the panel unit 8. This structure lengthens the distance between the light-blocking layer 10 and the indicator light projector 45. In this case, the indicator 46 can be clearly recognized by the user as long as the user views the indicator portion 18 from a front position in which the viewpoint of the user is aligned with the indicator opening 44 and the lens 47. However, the indicator 46 will be dark and difficult to recognize if the user views the indicator portion 18 from an angled position in which the viewpoint of the user is aligned with, for example, the indicator opening 44 and the bezel 51. In this manner, visual recognition of the indicator 46 is greatly affected by the angle θ at which the user views the indicator portion 18.

Figure 8:
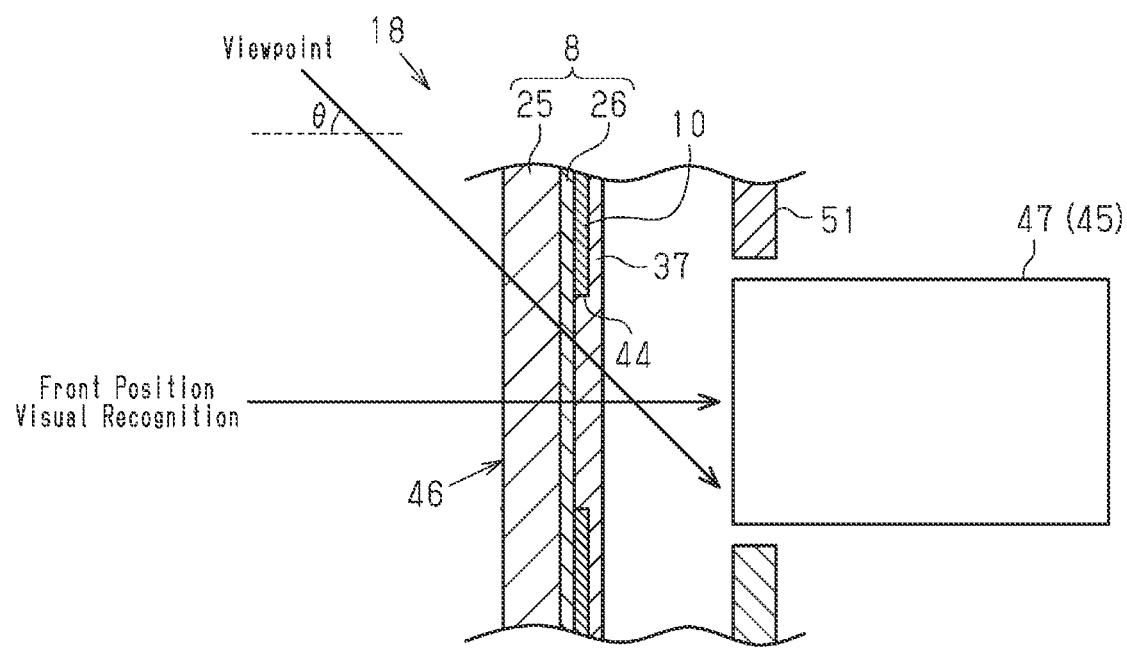
FIG. 8 is a diagram illustrating the indicator portion of the present example.

As shown in FIG. 8, in the present example, the light-blocking layer 10 is arranged on the rear surface of the panel unit 8. This shortens the distance between the light-blocking layer 10 and the indicator light projector 45. In this case, even if the user views the indicator portion 18 from an angled position, the viewpoint of the user will be aligned with the indicator opening 44 and the lens 47. Thus, the indicator 46 will be bright and visually recognizable.

The indicator 46 is highly visible even when viewed from an angled position. Thus, a number of indicator portions 18 can be located close to one another at narrow intervals. This allows a large number of indicators 46 to be arranged in a small area.

The panel device 4 in the above embodiment has the following advantages.

(1) The panel device 4 includes the panel unit 8, the light-blocking layer 10, and the indicator light projector 45. The light-blocking layer 10 is located between the panel unit 8 and the indicator light projector 45. With this structure, the indicator light projector 45 is located relatively close to the light-blocking layer 10. Thus, when the indicator 46 shown on the panel unit 8 is viewed from the outer side, the representations displayed by the indicator light projector 45 are visually recognizable even if the user views the panel unit 8 from an angled position where the angle θ with respect to the panel unit 8 is relatively large. This ensures that the indicator 46 is visually recognizable.

(2) The light-blocking layer 10 is arranged on the rear surface of the panel unit 8. With this structure, the panel unit 8 and the light-blocking layer 10 can be integrated as a single component.

(3) The panel unit 8 has a black background corresponding to the color of the light-blocking layer 10. With this structure, the panel unit 8 having a uniform black color improves the aesthetic appeal of the panel device 4.

(4) Each indicator portion 18 in the panel device 4 includes the indicator opening 44 and the indicator light projector 45. With this structure, the indicators 46 displayed on the panel unit 8 improve the aesthetic appeal of the panel device 4.

(5) The indicator portions 18 are located adjacent to one another. This structure reduces the size of the indicator light projector 45 (lens 47) and consequently reduces the indicator portion 18 in size. Thus, a large number of indicator portions 18 can be arranged in a small area.

(6) Each display 16 in the panel device 4 includes the window frame 22 and the image displaying unit 23. This structure allows various images provided by the display 16 to be shown on the panel unit 8 and improves the aesthetic appeal of the panel device 4.

(7) Each symbol portion 17 in the panel device 4 includes the mark opening 33, the mark light projector 34, and the detector 35. With this structure, the operable marks 36 that are displayed on the panel unit 8 improve the aesthetic appeal of the panel device 4.

The present embodiment may be modified as follows. The present embodiment and the following modifications can be combined as long as the combined modifications remain technically consistent with each other.

Two or more of the display 16, the symbol portion 17, and the indicator portion 18 may share, for example, the same lens and light source.

When there are multiple indicator portions 18, the indicator portions 18 may share the same set of a lens and a light source.

The light-blocking layer 10 does not have to be attached to the rear surface of the panel unit 8 and may be attached to, for example, a surface on the lens of the indicator light projector 45.

The light-blocking layer 10 does not have to be attached to the panel unit 8 or the indicator light projector 45 and may be located between the panel unit 8 and the indicator light projector 45.

The light-blocking layer 10 may be a sheet formed continuously on the display 16, the symbol portion 17, and the indicator portion 18. Alternatively, the light-blocking layer 10 may be sheets separated from one another between the display 16, the symbol portion 17, and the indicator portion 18.

The light source of the display 16 may be a member other than an LED. The same applies to the symbol portion 17 and the indicator portion 18.

The switch 19 is not limited to a toggle switch and may be changed to a push-button, a dial switch, or the like.

The panel device 4 is not limited for use with a vehicle on-board device and may be used for other devices or apparatus. In other words, the panel device 4 may be installed in any object as long as the object notifies a user of various types of information related to the operation of the device 3 with representations.

The present disclosure described in accordance with examples is to be considered as illustrative and not restrictive, and the present disclosure is not to be limited to the details given herein, but may be modified within the scope and equivalence of the appended claims.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A panel device, comprising:
    a panel unit that is light-transmissive and one of colored or colorless;
    a light-blocking layer including an indicator opening that is shaped in correspondence with an indicator to indicate when a device is activated; and
    an indicator light projector that emits light from a rear side of the panel unit, the indicator light projector including a lens that transmits the emitted light to the panel unit to display the indicator on the panel unit with the light passing through the indicator opening,
    wherein a front surface shape of the lens is larger than an opening shape of the indicator opening, and
    wherein the light-blocking layer is located between the panel unit and the indicator light projector.

2. The panel device according to claim 1, wherein the light-blocking layer is arranged on a rear surface of the panel unit.

3. The panel device according to claim 1, wherein the panel unit includes a black background corresponding to a color of the light-blocking layer.

4. The panel device according to claim 1, comprising:
    an indicator portion that includes
        the indicator opening, and
        the indicator light projector that emits light from the rear side of the panel unit to the indicator opening to display the indicator, which is shaped in correspondence with the indicator opening, on the panel unit.

5. The panel device according to claim 4, wherein the indicator portion is one of multiple indicator portions, and the multiple indicator portions are arranged adjacent to one another.

6. The panel device according to claim 1, comprising:
    a display that includes
        a window frame arranged in the light-blocking layer, and
        an image displaying unit that projects an image from the rear side of the panel unit through the window frame onto the panel unit to display the image on the panel unit.

7. The panel device according to claim 1, comprising:
    a symbol portion that includes
        a mark opening arranged in the light-blocking layer,
        a mark light projector that emits light from the rear side of the panel unit to the mark opening to display a mark, which is shaped in correspondence with the mark opening, on the panel unit, and
        a detector arranged inward from the mark opening to detect when the panel unit is touched at the mark.

* * * * *